United States Patent
Saikia et al.

(10) Patent No.: US 10,503,803 B2
(45) Date of Patent: Dec. 10, 2019

(54) ANIMATED SNIPPETS FOR SEARCH RESULTS

(71) Applicant: Google LLC, Mountain View, CA (US)

(72) Inventors: Amitabh Saikia, Mountain View, CA (US); Randall G. Keller, Palo Alto, CA (US)

(73) Assignee: Google LLC, Mountain View, CA (US)

(*) Notice: Subject to any disclaimer, the term of this patent is extended or adjusted under 35 U.S.C. 154(b) by 379 days.

(21) Appl. No.: 15/360,631

(22) Filed: Nov. 23, 2016

(65) Prior Publication Data

US 2018/0144059 A1   May 24, 2018

(51) Int. Cl.
*G06F 16/90* (2019.01)
*G06F 16/957* (2019.01)
*G06F 16/951* (2019.01)

(52) U.S. Cl.
CPC ........ *G06F 16/9577* (2019.01); *G06F 16/951* (2019.01)

(58) Field of Classification Search
CPC ... G06F 16/9577; G06F 16/957; G06F 16/951
See application file for complete search history.

(56) References Cited

U.S. PATENT DOCUMENTS

| | | | |
|---|---|---|---|
| 6,643,641 B1 | 11/2003 | Snyder | |
| 7,437,370 B1 | 10/2008 | Ershov | |
| 8,650,196 B1* | 2/2014 | Zhou | G06F 16/35 707/737 |
| 2003/0014415 A1 | 1/2003 | Weiss et al. | |
| 2006/0242553 A1 | 10/2006 | Kulas | |
| 2007/0244866 A1 | 10/2007 | Mishkanian et al. | |
| 2007/0255702 A1 | 11/2007 | Orme | |
| 2009/0307571 A1 | 12/2009 | Gowda et al. | |
| 2013/0019149 A1* | 1/2013 | Spencer | G11B 27/034 715/202 |

OTHER PUBLICATIONS

International Search Report and Written Opinion issued in International Application No. PCT/US2017/049564, dated Nov. 29, 2017, 12 pages.

* cited by examiner

*Primary Examiner* — Kristopher Andersen
(74) *Attorney, Agent, or Firm* — Fish & Richardson P.C.

(57) ABSTRACT

Methods, systems, and apparatus, including computer programs encoded on a computer storage medium, for generating and providing animation snippets. In one aspect, a method includes determining page resources that each include a plurality of persistent visual resources, for each of the determined page resources, generating one or more animation snippets from the persistent visual resources, for a page resource for which one or more animation snippets have been generated, selecting one of the animation snippets for display as a search result that identifies the page resource as being responsive to a search query; and providing animation snippet to a user device from which the query was submitted.

21 Claims, 5 Drawing Sheets

ANIMATED SNIPPETS FOR SEARCH RESULTS

BACKGROUND

The Internet provides access to a wide variety of information. For example, resources such as digital image files, video and/or audio files, as well as web pages for particular subjects or particular news articles, are accessible over the Internet. These resources are crawled and indexed by search engine systems. The search engine systems receive queries from users, and search indexed resources to find information related to the user's informational need. The search engine system then ranks the resources in order of responsiveness, and provides search results that identify the resource according to the ranking of the resources.

For web pages, the search results can include a web page title, a snippet of text extracted from the web page, a URL of the web page, and, in some situations, an image of the web page. For images, the search result can be a thumbnail of an image.

A user reviews the search results and, depending on the information included in the search result, may select one or more search results to cause the user device to navigate to the underlying resources. Search results, however, provide only a textual and/or visual summary of a resource to which it links. Thus, while search results may be informative of the underlying resources, a user, after navigating to the resources, may find that the resource does not satisfy the user's informational needs. The user may then navigate back to the search results page and select another resource, or additional resources, before the user finds a resource that satisfies the user's informational need. As a result, the search system may process additional analytics traffic that would not have been necessary had the user selected first the resource that is most satisfactory to the user's informational need. Likewise, web servers may respond to resource requests that are quickly ignored by the requesting user, which, in turn, wastes web serving resources.

SUMMARY

This specification describes technologies relating to providing animation snippets responsive to search queries.

In general, one innovative aspect of the subject matter described in this specification can be embodied in methods that include the actions of determining page resources that each include a plurality of persistent visual resources, each persistent visual resource being a visual resource that is displayed each time the page resource is displayed at a user device; for each of the determined page resources, generating one or more animation snippets from the plurality of persistent visual resources, comprising, for each of the one or more animation snippets: selecting a subset of the persistent visual resources, from each of the selected persistent visual resources, generating an image frame, generating an animation snippet for the page resource, wherein the animation snippet includes each of the image frames generated from the selected persistent visual resources and that displays the image frames in a specific order; for a page resource for which one or more animation snippets have been generated, selecting one of the animation snippets for display as a search result that identifies the page resource as being responsive to a search query; and providing animation snippet to a user device from which the query was submitted. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The systems and methods disclosed herein describe combining multiple images from a page resource and creating animation snippets from the images within the page resource. Determining page resources that do not have persistent images helps to provide consistent animation snippets for page resources. In addition, creating animation snippets based at least in part on the location of images within a page resource can help create animation snippets that are representative of the subject matter of the page resource.

More particularly, an animation snippet is a collection of two or more images or video frames that are collected from visual resources, e.g., images or videos, hosted in another resource, e.g., a web page. The animation snippet provides a visual summary of information for a resource that is more detailed than the summary of information provided by a single image in a search result. The animation snippet solves the technical problem of reducing extraneous web traffic resulting from users selecting multiple search results in an effort to fine a resource that satisfies the user's informational need. The animation snippet solves the additional technical problem of providing multiple different images from a resource in a search result with limited display space by providing the multiple different images as a series of frames in a single display space. This provides a flexible format for providing any number of images in a search result, as each of the images are shown in the same space in an animation sequence.

A selection process that operates on a resource enables the selection of visual resources that are most likely to provide useful information to a user. The selection process reduces the likelihood that extraneous images that are not informative of the information described by the resource are included in the animation snippet. Examples of such extraneous images are formatting images, e.g., bars, buttons, and the like, and non-persistent images that may change with each serving of the resource, such as advertisement images. This addresses the technical problem of size management so that the size of the animation snippet that is generated is not bandwidth intensive.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

The systems and methods described herein create animation snippets that depict visual resources included in a page resource. A page resource can be a webpage that can be rendered in a browser, or an instance of a display environment within a native application, for example. An animation snippet contains multiple frames, where each frame corresponds to a visual resource from the particular page resource. The animation snippet can be a single file, such as an animated GIF, or a video file. In other implementations, the animation snippet can be a collection of images that are selectively displayed in a sequence, where each image appears as a frame. The frames are presented in a specific order as an animation. The animation snippets can be presented within a set of search results.

For example, a given search result may be presented with an animation snippet for a particular page resource and displayed in the set of search results. The animation snippet appears as a static image until a user interacts with the image. For example, when a user interacts with the animation snippet (e.g., placing a mouse pointer over the animation snippet, placing a finger on the animation snippet, pressure applied on the image with a force touch, highlighting the animation snapper, etc.) the image will play an animation that includes frames generated from selected visual resources that are displayed within the particular page resource. An animation snippet can be provided as an image search result, or can be provide with text and other information from a resource.

Creating animation snippets for search results helps users determine which page resource to request by giving users a preview of relevant content displayed within the page resource. Providing users with an animated snippet of the images contained within a page resource can be more indicative of the webpage's subject matter, and thus help the user determine whether the page resource is responsive to the user's informational need as indicated by a search query.

Example Operating Environment

Figure 1A:
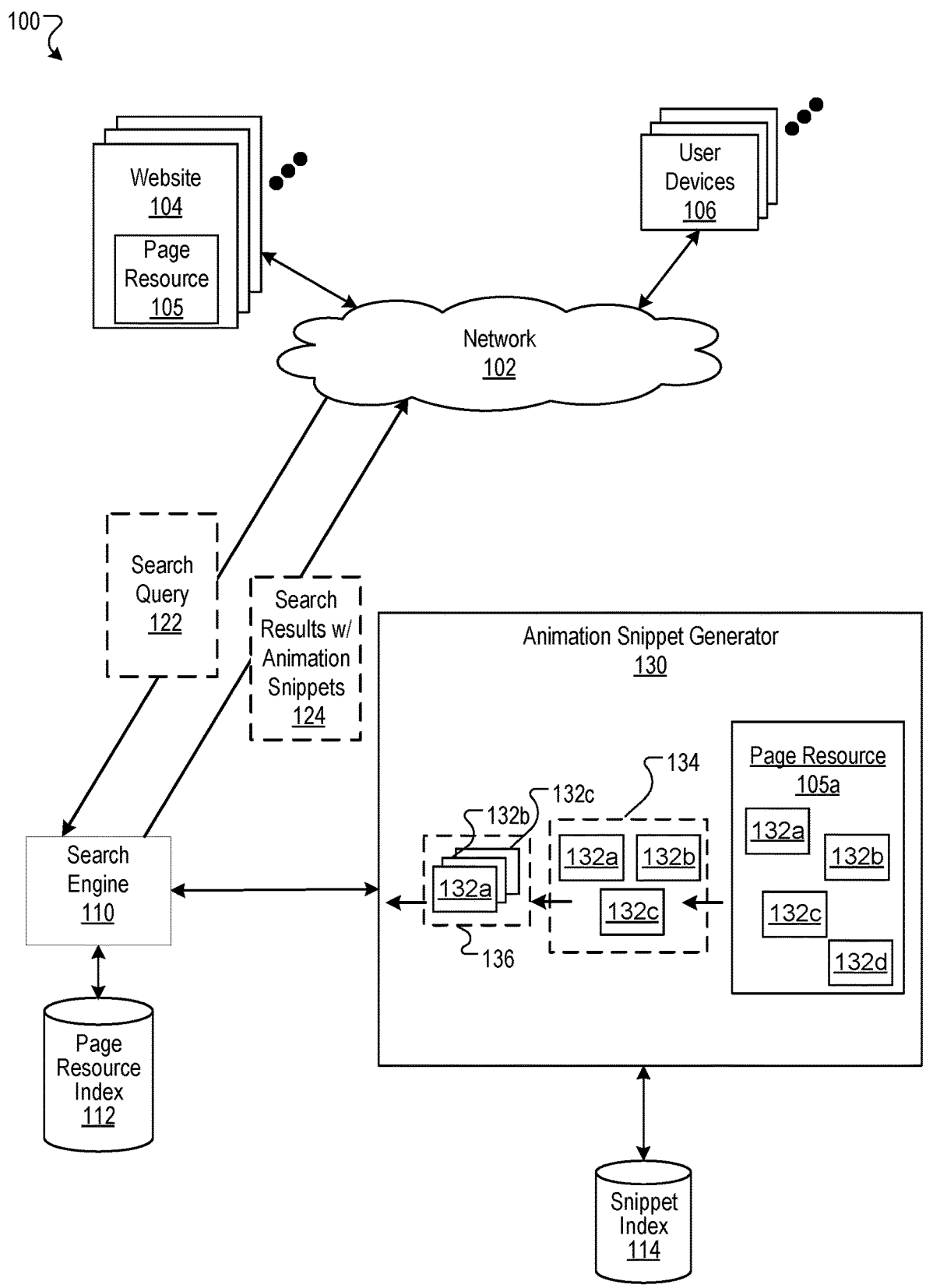
FIG. 1A is a block diagram of an example environment for generating animation snippets for presentation within search results.

FIG. 1A is a block diagram of an example environment 100 for generating animation snippets for presentation within search results. A computer network 102, such as a local area network (LAN), wide area network (WAN), the Internet, or a combination thereof, connects publisher web sites 104, user devices 106, and the search engine 110. The online environment 100 may include many thousands of websites 104 and user devices 106.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each such page is referred to as a resource 105. Other types of page resources can also be processed by the search engine 110, including video files, audio files, and the like.

A resource is any data that can be provided by the publisher over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/ or embedded instructions (such as scripts).

A user device 106 is an electronic device capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these page resources 105, the search engine 110 identifies the resources by crawling the page resources 105 and indexing the resources provided by the websites 104. The indexed and, optionally, cached copies of the resources are stored in a page resource index 112.

The user devices 106 submit search queries 122 to the search engine 110. The search queries 122 are submitted in the form of a search request that includes the search request. In response to the search request, the search engine 110 uses the page resource index 112 to identify resources that are relevant to the queries. The search engine 110 identifies the resources in the form of search results 124 and returns the search results to the user devices 106 in a search results page that includes multiple search results. A search result is data generated by the search engine 110 that identifies a resource that satisfies a particular search query, and includes a resource locator for the resource. An example search result is a page search result that can include a web page title, a snippet of text extracted from the web page, and the URL of the web page. Another type of search result is an image search result that includes an image as the search result. As will be described in more detail below, both the page search results and the image search results may include animation snippets.

An animation snippet contains a number of frames from visual resources for a particular page resource. The animation snippet may be in the form of a signal image file. The animation snippet may also be in the form of multiple image files and a script that instructs a browser to display the image files in a particular order within a same display space. The visual resources can include static images, dynamic images, whole videos, or selected frames from particular videos. The animation snippet 136 presents the frames, one at a time, in a specific order to convey a repeated animation.

The user devices 106 receive the search results pages and render the pages for presentation to users. In response to the user selecting a search result at a user device 106, the user device 106 requests the resource identified by the resource locator included in the selected search result. The publisher of the page resource 104 hosting the resource receives the request for the resource from the user device 106 and provides the resource to the requesting user device 106.

Animation Snippet Generation

An animation snippet generator 130 generates animation snippets for inclusion with search results. The animation snippet generator 130 identifies persistent visual resources for inclusion in the animation snippet. A persistent visual resource is an image and/or video that does not change each time a page resource is loaded. For example, a page resource containing subject matter about safaris may include an image of a lion and a banner ad with a particular image. Each time the safari page resource is loaded the same image of the lion is always presented, unless the image is modified by the page resource creator. However, the image presented in the banner ad may change each time the page is loaded with the particular banner ad. Thus, the image of the lion is a persistent visual resource and the image presented in the banner ad is a non-persistent image.

The animation snippet generator 130 can determine persistent visual resource by a variety of methods. One method is to repeatedly load the page resource and determine, from the document object model (or other structural data of the rendered page resource) visual resources that are the same for each page load and visual resources that differ for each page load. Another method is to process the instructions of the page resource and determine from the instructions whether a visual resource is persistent. For example, an instruction that calls a same image for each page load, e.g., IMG=www.example.com/images/image001.jpg, would identify image001.jpg as a persistent visual resource. Other instructions, such as ad requests, weather requests, stock ticker requests, etc., may be determined to specify non-persistent visual resources. Such request types can be specified to the animation snippet generator 130, or can be discovered by repeatedly loading the page resource and determining, from the document object model (or other structural data of the rendered page resource) visual resources that are different for each page load.

The animation snippet generator 130 receives page resource information from the search engine (or from the website 104) to create the animation snippets responsive to search queries. The animation snippet generator 130 determines which page resources to create animation snippets for. Typically, any resource that includes two or more persistent visual images may be selected by the animation snippet generator 130 to create an animation snippet. For example, the animation snippet generator 130 determines that an animation snippet is to be generated a page resource 105a that includes persistent visual resources 132a, 132b, 132c and 132d. The animation snippet generator 130 selects a subset of persistent visual resources 134 from which to generate frames to include in the animation snippet 136. As will be discussed in greater detail in connection with FIG. 3, the animation generator 130 may select images for frame generation for the animation snippet based, at least in part, on location and/or aspect ratio.

In some implementations, the animation snippet generator 130 stores created animation snippets 136 in the snippet index 114. Generation of the animation snippets is performed independent of receiving a search query 122, and one or more animation snippets 136 generated for a page resource are indexed with the page resource 105 to associate the one or more animation snippets 136 with the page resource 105. The search engine 110 can then retrieve stored animation snippets 136 and provide previously generated animated snippets 136 for inclusion with a set of search results 124. In other implementations, the animation snippet generator 130 may generate the animation snippets 136 at query time.

To illustrate how an animation snippet provides information to a user, assume that a user wants information about safaris. A particular page resource 105a may include subject matter about safaris, including images of jeeps 132a, a lion 132b, and people on a safari 132c. The animation snippet generator 130 may have processed the page resource 105a prior to query time, or at query time, to identify the subset of images 134 of the jeeps 132a, the lion 132b, and the people on a safari 132c. The animation snippet generator 130 generates, for example, an animation snippet that includes the image of jeeps 132a as the first frame and the representative visual resource for the animation snippet. A representative visual resource is the static visual resource that is presented as the first frame for an animation snippet.

The second frame may be the image of the lion 132b, and the third frame the image of the people on safari 132c. The animation snippet generator 130 collects the frames from the 132a-c into an animation snippet 136. The animation snippet 136 is then provided as part of a search result that identifies the resource 105a in response to a query. When the user interacts with the animation snippet 136, the user will first see the image of the jeeps 132a for a set period of time, then the user will see the image of the lion 132b for a set period of time, and the image of the people 132c third for a set period of time. Afterwards, the animation snippet 136 starts the animation again from the beginning, starting with the image of the jeeps 132a.

Example Animation Snippets

Figure 1B:
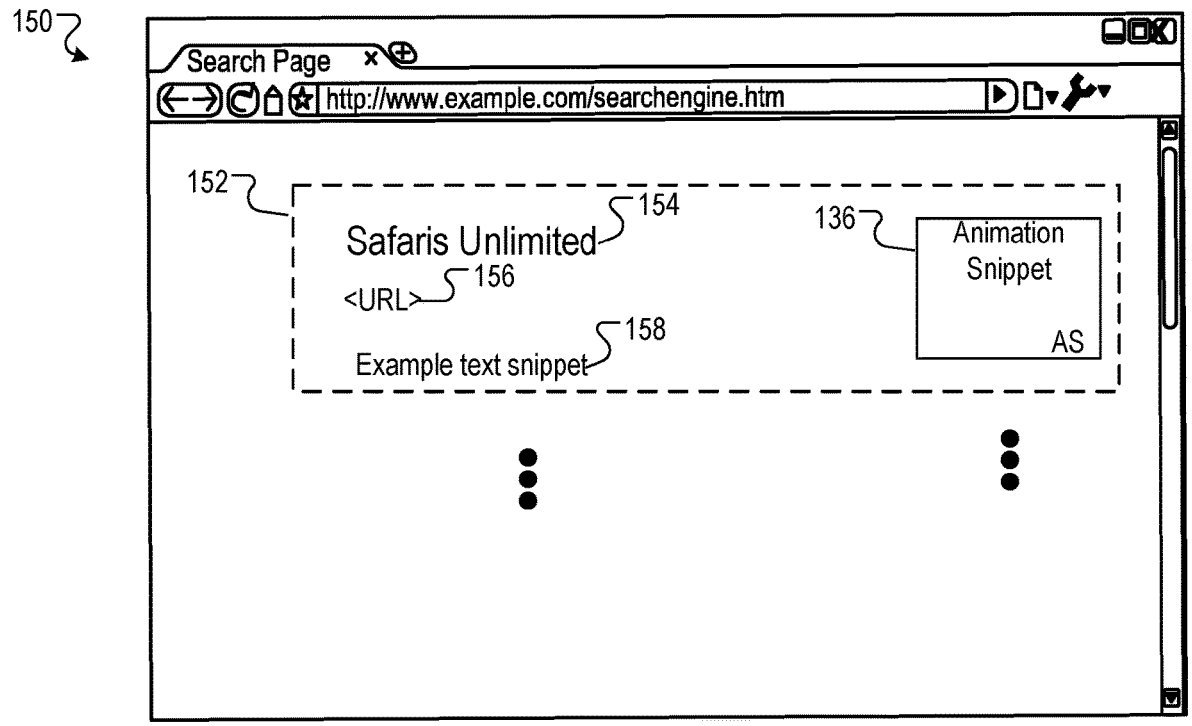
FIG. 1B is a block diagram of an example search result page that includes a search result with an animation snippet.

FIG. 1B is a block diagram of an example search result page 150 that includes a search result 152 with an animation snippet 136. In some implementations, the animation snippet 136 is displayed with at least one other set of data extracted from the page resource displayed separately from the animation snippet. The animation snippet 136 is identified as an animation snippet with an identifier (e.g., "AS" or "GIF" for an animated GIF, JPEG, AVI, etc.) superimposed over the static visual resource presented as the first frame of the animation snippet 136.

Then at least one other set of data can be included in the search result 152. For example, the search result 152 may include a title 154, a uniform resource locator (URL) 156, a text snippet 158 in additional to the animation snippet 136. The title 154 can include the name or title of the page resource which broadly describes the subject matter of the page resource. The URL 156 is a reference address for the particular page resource presented within the page resource search result 150. The text snippet 154 is a portion of text from the page resource giving a user a small sample of the page resource's subject matter. The animation snippet 136 includes an animation of persistent visual resources that are presented within a particular search result entity 152.

For example, the search result 152 may link to the particular safari page resource 105a described above. The title "Safaris Unlimited" is displayed informing the user that this particular page resource 105a includes subject matter about safaris. The animation snippet 136, for example, may be the animation snippet 136 including the image of the jeeps 132a, the lion 132b, and the people on safari 132c. The example text snippet includes a portion of the safari page resource 105a that may include information on safari tours.

The animation snippet can be presented in various formats. In some implementations, the animation snippet 136 is presented as a static image that presents the animation when the user interacts with the animation snippet 136. In other implementations, the animation snippet 136 can be presented in an auto-play format, where the animation plays within the page resource without user interaction. The animation snippet may also download after the interaction, and begin playing after the animation snippet downloads.

Figure 1C:
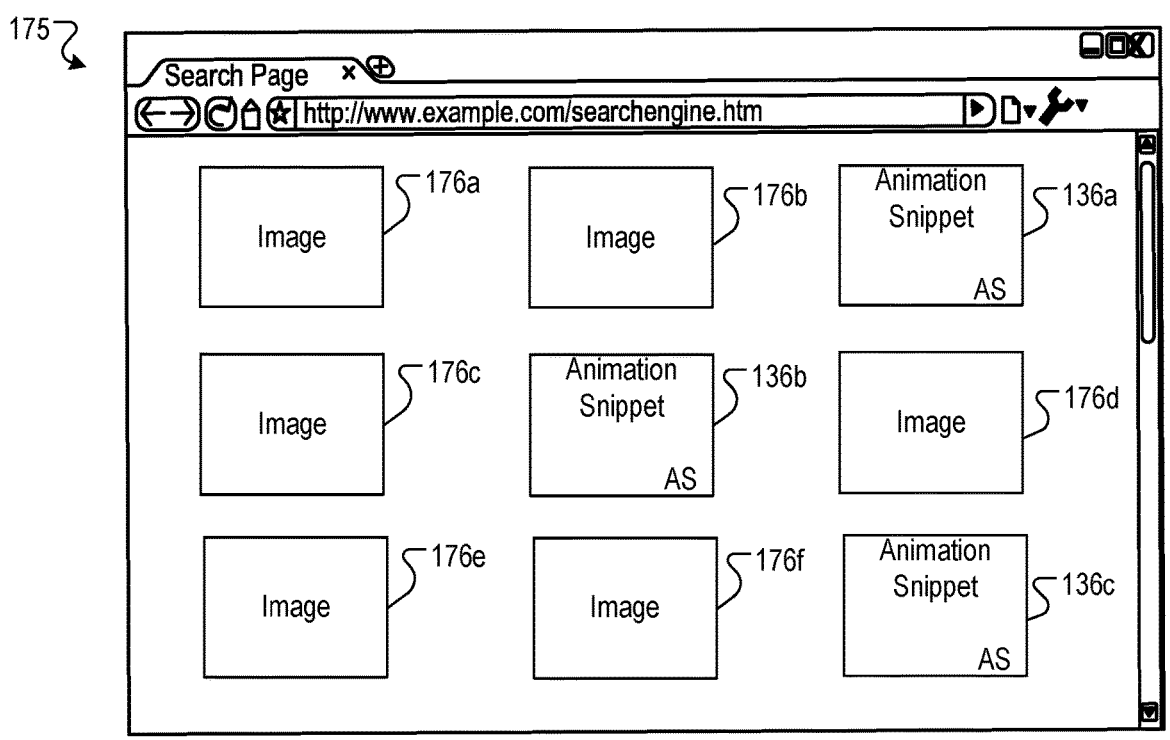
FIG. 1C is a block diagram of example image search results page that includes image search results, some of which are animation snippets.

FIG. 1C is a block diagram of example image search results page 175 that includes image search results, some of which are animation snippets. Image search results 176a-176f are single images, and image search results 136a-136c are animation snippets. For example, the image search results 176a-f may contain a plurality of image thumbnails for safari related content, and the animation snippets 136a-c may also be for safari related content. As previously described in connection with FIG. 1B, the animation snippets are differentiated from static images with an identifier (e.g., "AS") super imposed over the representative visual resource.

Each of the animation snippets 136a-136c is presented as a static image within the image search results page 175. As a user interacts with each of the animation snippets 136a-136c individually, the animation snippet begins to play the animation within the image search results page 175. The user can click on the animation snippet 136a-136c just like an image and be taken to the page resource 105 that includes the visual resources in the animation snippet 136a-136c.

Example Process Flows

Figure 2:
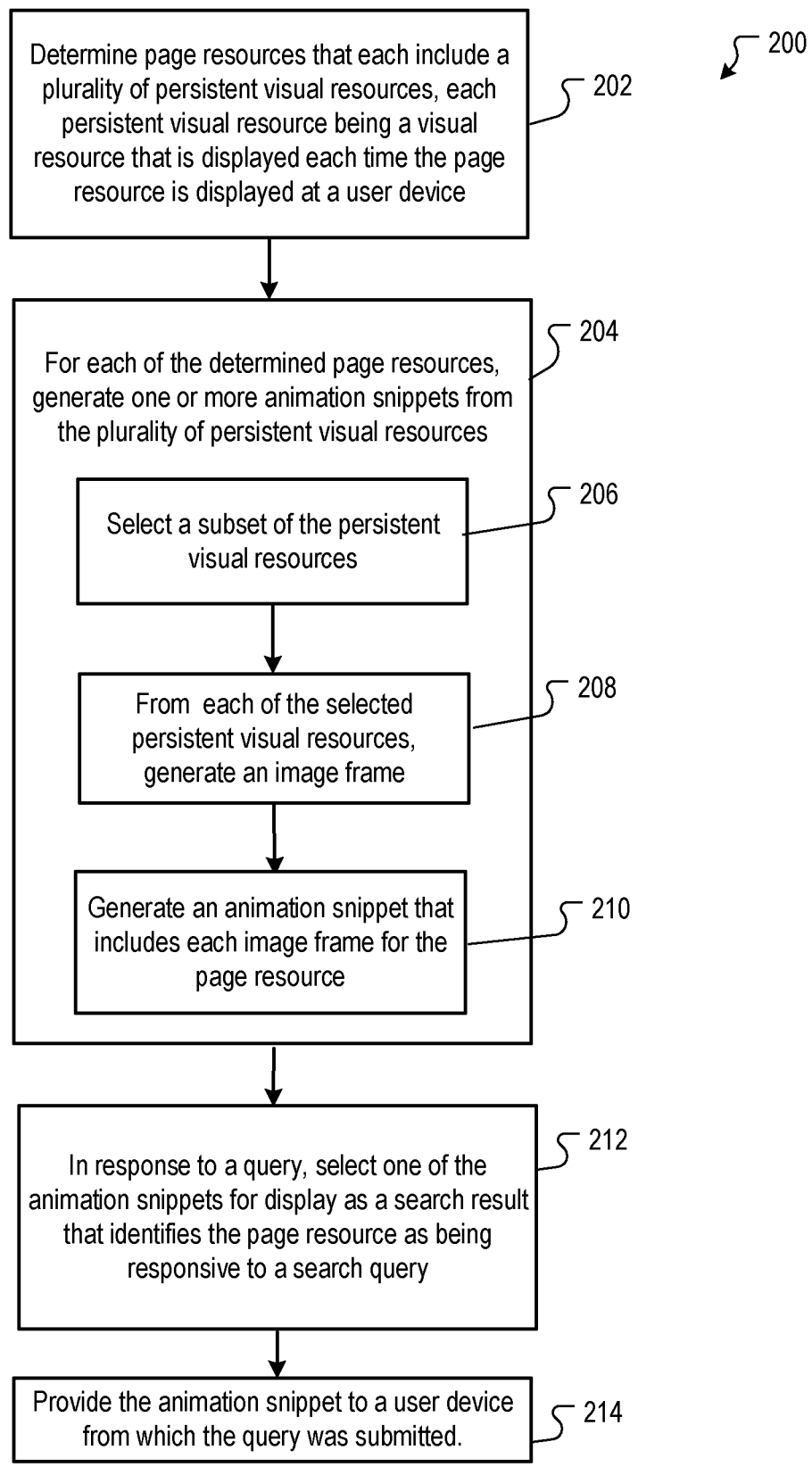
FIG. 2 is a flow chart describing a process for generating and providing animation snippets.
Figure 3:
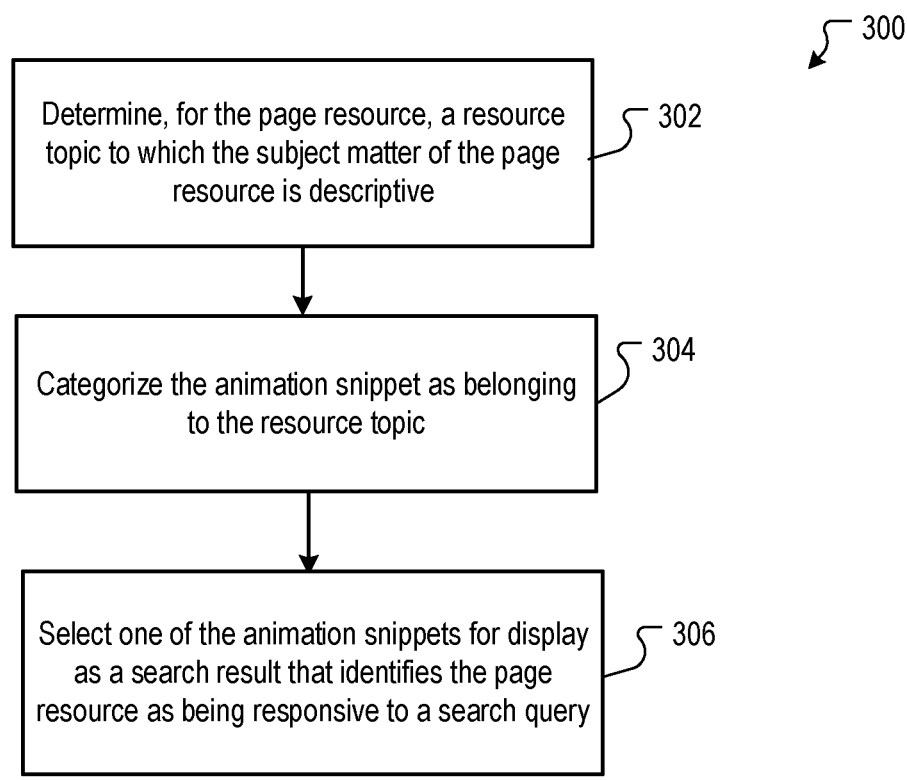
FIG. 3 is a flow chart describing a process for determining topical categories for an animation snippet.
Figure 4:
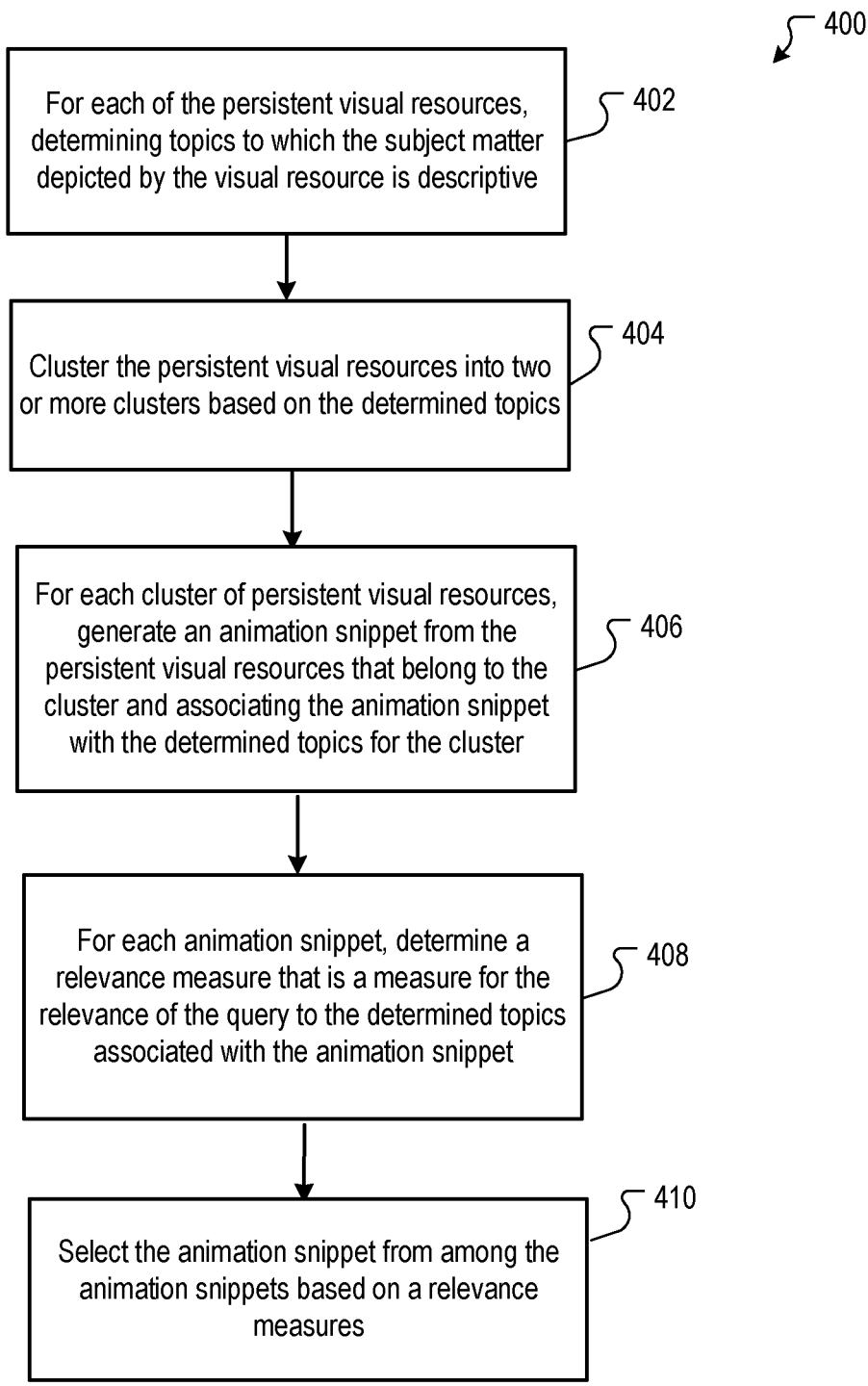
FIG. 4 is a flow chart describing topical categories for visual resources within a page resource and choosing animation snippets responsive to a search query.

FIGS. 2-4 are example process flows for several animation snippet generation and processing algorithms. The processes of FIGS. 2-4 are implemented in one or more computer devices that are programmed to performed the operations described below.

FIG. 2 is a flow chart describing a process 200 for generating and providing animation snippets. The animation snippet generator 130 determines page resources that each include a plurality of persistent visual resources, wherein each persistent visual resource is a visual resource that is displayed each time the page resource 105 is displayed at a user device (202). The animation snippet generator 130 can detect persistent visual resources by loading a page resource multiple times and detecting matches of visual resources, or by processing page instructions, as described above.

The animation snippet may also discard some persistent visual resources from being candidates for inclusion in an animation snippet. Such resources may include high frequency content, such as buttons, bars, and the like. High frequency content may be visual resources that occur in multiple pages on a particular website. Detection of such high frequency content especially useful for websites that have a unique "look and feel" by use of formatting and branding images across multiple page resources in the website.

The animation snippet generator 130 may also include a list of "stop images," much like "stop words." These may be a library of very commonly used images that are used on multiple different websites. Such "stop images," when detected by matching an image from a page resource to an image in the stop image library, are excluded from being used to generate an animation snippet, even though they are otherwise persistent visual resources. An appropriate image matching algorithm can be used.

The animation snippet generator 130 generates one or more animation snippets from the plurality of persistent visual resources for the page resource (204). The animation generator 130 may create multiple animation snippets 136 for a particular page resource 105. The determination to create multiple animation snippets 136 may be based in part on the number of visual resources, the types of visual resources, the sizes of the visual resources, the topics of the visual resources, the topic of the page resource, etc. Steps 206, 208 and 210 are performed for each particular animation snippet generated for a particular page resource.

Continuing with the safari page resource 105a example, the general topic of the page resources may be safaris, while the animation snippet generator 130 can create an animation snippet 136 including the images of the jeeps 132a, the lion 132b, and the people on safari 132c to represent the general topic of safaris. However, the safari page resource 105a may also include images of a giraffe, a zebra, and a gazelle. The animation snippet generator 130 may create an animation snippet 136 of the lion 132b, the giraffe, the zebra, and the gazelle to represent the general topic of African animals. Further discussion regarding determining resource topics and animation snippet topics will be discussed in connection with FIGS. 3 and 4.

For each animation, the animation snippet generator selects a subset of the persistent visual resources (206). The animation snippet generator 130 may not select all of the persistent visual resources. The selection may be topic based, and selection based on topic is described with reference to FIGS. 3 and 4 below.

Selections may also be based on "stop images" to exclude low information images as describe above.

Selections may also be based on the location of the persistent visual resource. For example, the animation snippet generator 130 determines, for each persistent visual resource, a location of the persistent visual resource on the page resource for when the page resource is rendered for display and a location score for the persistent visual resource. The location score is indicative of how prominent the position of the visual resource is within the page resources. The score be proportional to the visual resource's distance from a centroid of the rendered resource, and/or its proximity to an edge of the rendered resource, or whether it is located in a frame owned by another domain. A variety of scoring algorithms and formulas can be used. For example, a visual resource that is presented in the center of a resource will have a higher location score than an image that is located in a bottom corner of the page resource.

In some implementations, the location score can be binary, for example, an image resource within a certain boundary of the page resource may receive a "1," and a "0" otherwise. The animation snippet generator 130 may detect persistent visual resources that are within a particular boundary within the page resource and score the persistent visual resources as either within the boundary or outside of the boundary. Persistent visual resources that are within the boundary are selected for inclusion within the animation snippet 136.

The location score also be a real number that is indicative of a visual resource's distance away from the central region of the page resource. The closer a persistent visual resource is to the center region of the page, the higher the location score. In this implementation, the animation snippet generator 130 may have a location score threshold value for the location score of the persistent visual resources. The animation snippet generator 130 selects the persistent visual resources based on the location score. For example, persistent visual resources that have a location score above the location score threshold value are selected for inclusion in the animation snippet 136.

In some implementations, persistent visual resources are selected for inclusion in an animation snippet based on the aspect ratio of the persistent visual resource. The animation snippet generator, for each persistent visual resource, determines an aspect ratio for the persistent visual resource, assigns an aspect ratio score, and selects the persistent visual resources for inclusion in the subset of persistent visual resources when the aspect ratio meets one or more aspect ratio size criterion.

For example, aspect ratio size criterion can include a specific aspect ratio that a persistent visual resource must meet and the location score can have a binary value. If the visual resource meets the specific aspect ratio threshold value, the persistent visual resource is assigned an aspect ratio score of 1, if not the persistent visual resource is below a specific aspect ratio threshold value, the persistent visual resource is assigned an aspect ratio score of 0. The animation snippet generator 130 generates an animation snippet for all persistent visual resources with an aspect ratio score of 1.

In some implementations, the aspect ratio score can be a real number that increases as the aspect ratio for a virtual resource increases. For example, the larger the aspect ratio the higher the aspect ratio score. The animation snippet generator 130 selects visual resources with an aspect ratio score that is above a particular aspect ratio score threshold for inclusion in animation snippets 136.

The animation snippet generator 130 can use the location score, the aspect ratio score, or a combination of both, to select a subset of images for inclusion in an animation snippet 136. Other scoring and selection processes can also be used, e.g., color schemes, image format types, etc.

The animation snippet generator 130 generates an image frame for each of the selected persistent visual resources (208). For each image that is selected, the frame may be the image, or a thumbnail of the image. The frame may also be a cropped portion of the image.

In the case of a video resource, the animation snippet generator generates an image frame and may take every nth frame of the video for inclusion in the animation snippet 136. Thus, for a page resource for which three images and a video are selected to generate an animation snippet, the animation snippet includes three frames that respectively correspond to the three images, and at least one or more frames that correspond to the video.

The animation snippet generator 130 generates an animation snippet for the page resource (210). In some instances, the animation snippet includes each of the image frames generated from the selected persistent visual resources and that displays the image frames in a specific order. The animation snippet generator 130 aggregates all of the image frames to create the animation snippet so that each frame is presented in a particular order for a set time duration. The order can be randomly selected, or based on image topics, or based on any appropriate ordering criteria.

In response to a search query, the search system selects one of the animation snippets for display as a search result that identifies the page resource as being responsive to a search query (212). As previously described, the animation snippet can be provided in a page resource search result or as an image search result. The search engine provides the animation snippet 136 to a user device from which the query was submitted (214). The search engine 110 incorporates the animation snippet 136 into the set of search results for presentation at the user device 106 and provides a search results page that includes the animation snippets to the user device.

FIG. 3 is a flow chart describing a process 300 for determining topical categories for an animation snippet. As previously described in connection with FIG. 2, the animation snippet generator 130 selects a subset of the persistent visual resources to generating an animation snippet for the page resource. In FIG. 3, the process 300 determines a main topic (or main topics) for a page resource, and generates an "informational" animation snippet that includes frames for each of the selected persistent visual resources. The animation snippet is then associated with the general topic, and provided for an informational search query that maps to the general topic.

For each page resource the animation snippet generator 130 determines a resource topic to which the subject matter of the page resource is descriptive (302). Referring back to the safari example, the animation snippet generator 130 can determine that the safari page resource 105a includes general subject matter about safaris.

Based on the determination of the topic for the page resource, the animation snippet generator categorizes the animation snippet 136 as belonging to the resource topic (304). The animation snippet 136 includes the image of the jeeps 132a, the lion 132b, and the people on safari 132c are categorized as an animation snippet for safaris.

The search engine 110 selects one of the animation snippets 136 for display as a search result that identifies the page resource as being responsive to a search query (306). Selecting an animation snippet 136 for display as a search result includes determining a topic for the query. For example, some search query terms may be general and include a set of general terms (e.g., "safari") that broadly describe the topic of the search query.

The search engine 110 determines whether the resource topic matches the topic for the query and in response to determining that resource topic matches the topic for the query, selects the animation snippet categorized as belonging to the resource topic. Thus, a general search query for safaris will cause the search engine 110 to return a search result that includes the animation snippet 136 including the image of the jeeps 132a, the lion 132b, and the people on safari 132c.

FIG. 4 is a flow chart describing topical categories for visual resources within a page resource and choosing animation snippets responsive to a search query. Recall that FIG. 3 describes the process for generating an informational animation snippet. FIG. 4 is directed to a process that generates animation snippets that are directed to sub-topics of a particular resource. For example, instead of the query "safaris," a user may enter a query such as "what type of transportation is used on a safari," or "what animals can I see on a safari", etc. FIG. 4 facilities the generation of animation snippets that may be more informative for queries that are directed to narrower topics.

For each of the persistent visual resources, the animation snippet generator 130 determines topics to which the subject matter depicted by the visual resource is descriptive (402). For example, the image of the jeeps 132a within the exemplary safari page resources can be determined to contain the subject matter of jeeps. Likewise, the image of the lion 132b and the image of the people on safari 132c can be determined to contain subject matter on lions and people on safari respectively. Topic detection can be done by processing image tags that are descriptive of the content of the images, by computer vision processes, or other appropriate image categorization techniques.

The animation snippet generator 130 clusters the persistent visual resources into two or more clusters based on the determined topics (404). A variety of clustering techniques can be used, e.g., k-means clustering, agglomerative clustering, and the like. In the example of the safari page resource 105a, a first cluster may include only images of jeeps on safari and belong to the topic category of "safaris/transportation;" a second cluster may include only images of animals seen on safari, and belong to the topic of "safaris/animals," etc.

The animation snippet generator 130, for each cluster of persistent visual resources, generates an animation snippet from the persistent visual resources that belong to the cluster and associates the animation snippet with the determined topics for the cluster (406). For example, a first animation snippet may be crated from the first cluster that includes only images of jeeps on safari and be categorized as belonging to the topic category of "safaris/transportation." Likewise, a second animation snippet may be generated from the second cluster that include only images of animals seen on safari, and be categorized as belonging to the topic of "safaris/animals," etc.

The search system 110 selects a page resource to identify by a search result and, for each of the animation snippets for the page resources, determines a relevance measure that is a measure of the relevance of the query to the determined topics of the animation snippet (408). Any appropriate relevance process can be used, such as user selection rate analysis, topic relevance algorithms, term matching, vector products, etc. The more relevant the topic of an animation snippet 136 is to a query, the higher the relevance score.

For example, the search engine 110 may determine a topic for the query and compare the query topic to topics of the animation snippet. For example, the topics of the search query "what animals can I see on a safari" may be determined to be "safaris" and "animals." These topics may then be compared to the topics identified for the animation snippet. Any appropriate query topic identification process can be used.

In some implementations, the relevance measure may be based, in part, on user selection rates of one or more of the images in the animation snippet in response to the query. For example, if the images in the animation snippet have been provided in response to search queries, the rate of selection of the images in response to the query can be used to drive a relevance measure. In other implementations, the relevance measure may be based, in part, on prior selections of the animation snippet in response to the query (or in response to other queries that relate to topics that are similar to the topics of the query).

In some implementations, the relevance measure may also be based on a quality score for the animation snippet. The quality score of the animation snippet is determined by characteristics of the visual resources within the animation snippet. For example, quality score can be based on the size, brightness, contrast, color, clarity, level of compression, etc., of the visual resources. The better the characteristics of the visual resources in the animation snippet, the higher the quality score of the animation snippet. The search system 110, in some instances, can combine the quality score with the reliance score when determining the relevance of the animation snippet to the query.

Still other relevance determination algorithms can be used.

The search system 110 selects the animation snippet from among the animation snippets based on relevance a measures (410). The search system 110 can select animation snippets based on the relevance score meeting a relevance score threshold; for example, if none of the animation snippets has a relevance score that meets a minimum threshold, then no animation snippets are shown. Otherwise, the animation snippet with the highest relevance score that meets or exceeds the relevance score threshold is selected.

For example, responsive to the search query for "what animals can I see on a safari" the search system may determine that the animation snippet belonging to the topic safaris/animal has the highest relevance score relative to the animation snippets belonging to the topics of "safaris" and "safaris/transportation." The search system 110 provide the selected animation snippet 136 that includes images of the lion, giraffe, zebra, and gazelle in response to a search query "what animals can I see on a safari."

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A system comprising:
 a data processing apparatus comprising one or more processors; and a computer storage medium encoded with a computer program, the computer program comprising instructions that when executed by the data processing apparatus cause the one or more processors of the data processing apparatus to perform operations comprising:

determining page resources that each include a plurality of persistent visual resources, each persistent visual resource being a visual resource that is displayed each time the page resource is displayed at a user device;

for each of the determined page resources, generating one or more animation snippets from the plurality of persistent visual resources, comprising, for each of the one or more animation snippets:

selecting a subset of the persistent visual resources;

from each of the selected persistent visual resources, generating an image frame; and generating an animation snippet for the page resource, including:

determining, for the page resource, a resource topic to which the subject matter of page the resource is descriptive, and categorizing the animation snippet as belonging to the resource topic, wherein the animation snippet includes each of the image frames generated from the selected persistent visual resources and that displays the image frames in a specific order;

for a page resource for which one or more animation snippets have been generated, selecting one of the animation snippets for display as a search result that identifies the page resource as being responsive to a search query, wherein the selecting is based on a match between a topic for the search query and the resource topic that the one of the animation snippets was categorized as belonging to; and providing the selected animation snippet to a user device from which the search query was submitted.

2. The system of claim 1, wherein selecting a subset of persistent visual resources comprises:

for each persistent visual resource:

determining a location of the persistent visual resource on the page resource for when the page resource is rendered for display; and determining a location score for the persistent visual resource; and selecting the persistent visual resources for inclusion in the subset based on the location scores.

3. The system of claim 1, wherein selecting a subset of persistent visual resources comprises:

for each persistent visual resource:

determining an aspect ratio for the persistent visual resource; and selecting the persistent visual resources for inclusion in the subset when the aspect ratio meets one or more aspect ratio size criterion.

4. The system of claim 1, wherein:

selecting a subset of the persistent visual resources comprises selecting each of the persistent visual resources;

selecting one of the animation snippets for display as a search result that identifies the page resource as being responsive to a search query comprises:

determining the topic for the search query;

determining whether the resource topic matches the topic for the search query; and in response to determining that resource topic matches the topic for the search query, selecting the animation snippet categorized as belonging to the resource topic.

5. The system of claim 4, wherein selecting one of the animation snippets for display as a search result that identifies the page resource as being responsive to a search query further comprises, in response to determining that resource topic does not match the topic for the search query, selecting another animation snippet that has been generated for the page resource and that has not been categorized as belonging to the resource topic.

6. The system of claim 1, wherein:

generating one or more animation snippets from the plurality of persistent visual resources comprises:

for each of the persistent visual resources, determining topics to which the subject matter depicted by the visual resource is descriptive;

clustering the persistent visual resources into two or more clusters based on the determined topics; and for each cluster of persistent visual resources, generating an animation snippet from the persistent visual resources that belong to a cluster of the two or more clusters and associating the animation snippet with the determined topics for the cluster.

7. The system of claim 6, wherein selecting one of the animation snippets for display as a search result that identifies the page resource as being responsive to a search query comprises:

determining the topic for the search query;

for each animation snippet, determining a relevance measure that is a measure for the search query to the determined topics associated with the animation snippet; and selecting the animation snippet from among the animation snippets based on a relevance measures.

8. The system of claim 1, wherein generating an image frame for each persistent visual resource comprises generation a plurality of image frames from a persistent visual resource that is a video resource.

9. The system of claim 1, wherein the determining page resources and generating animation snippets is performed independent of receiving a search query, and further comprising, for each page resource for which one or more animation snippets have been generated, indexing the one or more animation snippets with the page resource to associate the one or more animation snippets with the page resource.

10. The system of claim 1, wherein the determining page resources and generating animation snippets is performed in response to receiving a search query.

11. The system of claim 1, wherein the search result is an image search result, and the animation snippet is displayed as the image search result.

12. The system of claim 1, wherein the search result is page resource search result, and the animation snippet is displayed with at least one other set of data extracted from the page resource displayed separately from the animation snippet.

13. A method performed by a data processing apparatus, the method comprising:

determining page resources that each include a plurality of persistent visual resources, each persistent visual resource being a visual resource that is displayed each time the page resource is displayed at a user device;

for each of the determined page resources, generating one or more animation snippets from the plurality of persistent visual resources, comprising, for each of the one or more animation snippets:
    selecting a subset of the persistent visual resources;
    from each of the selected persistent visual resources, generating an image frame; and
    generating an animation snippet for the page resource, including:
        determining, for the page resource, a resource topic to which the subject matter of page the resource is descriptive, and
        categorizing the animation snippet as belonging to the resource topic,
        wherein the animation snippet includes each of the image frames generated from the selected persistent visual resources and that displays the image frames in a specific order;
for a page resource for which one or more animation snippets have been generated, selecting one of the animation snippets for display as a search result that identifies the page resource as being responsive to a search query, wherein the selecting is based on a match between a topic for the search query and the resource topic that the one of the animation snippets was categorized as belonging to; and
providing the selected animation snippet to a user device from which the search query was submitted.

14. The method of claim 13, wherein selecting a subset of persistent visual resources comprises:
for each persistent visual resource:
    determining a location of the persistent visual resource on the page resource for when the page resource is rendered for display; and
    determining a location score for the persistent visual resource; and
selecting the persistent visual resources for inclusion in the subset based on the location scores.

15. The method of claim 13, wherein selecting a subset of persistent visual resources comprises:
for each persistent visual resource:
    determining an aspect ratio for the persistent visual resource; and
    selecting the persistent visual resources for inclusion in the subset when the aspect ratio meets one or more aspect ratio size criterion.

16. The method of claim 13, wherein:
selecting a subset of the persistent visual resources comprises selecting each of the persistent visual resources;
selecting one of the animation snippets for display as a search result that identifies the page resource as being responsive to a search query comprises:
    determining the topic for the search query;
    determining whether the resource topic matches the topic for the search query; and
    in response to determining that resource topic matches the topic for the search query, selecting the animation snippet categorized as belonging to the resource topic.

17. The method of claim 16, wherein selecting one of the animation snippets for display as a search result that identifies the page resource as being responsive to a search query further comprises, in response to determining that resource topic does not match the topic for the search query, selecting another animation snippet that has been generated for the page resource and that has not been categorized as belonging to the resource topic.

18. The method of claim 13, wherein:
generating one or more animation snippets from the plurality of persistent visual resources comprises:
    for each of the persistent visual resources, determining topics to which the subject matter depicted by the visual resource is descriptive;
    clustering the persistent visual resources into two or more clusters based on the determined topics; and
    for each cluster of persistent visual resources, generating an animation snippet from the persistent visual resources that belong to a cluster of the two or more clusters and associating the animation snippet with the determined topics for the cluster.

19. The method of claim 18, wherein selecting one of the animation snippets for display as a search result that identifies the page resource as being responsive to a search query comprises:
    determining a topic for the search query;
    for each animation snippet, determining a relevance measure that is a measure for the search query to the determined topics associated with the animation snippet; and
    selecting the animation snippet from among the animation snippets based on a relevance measures.

20. The method of claim 13, wherein generating an image frame for each persistent visual resource comprises generation a plurality of image frames from a persistent visual resource that is a video resource.

21. A non-transitory computer storage medium encoded with a computer program, the program comprising instructions that when executed by data processing apparatus cause the data processing apparatus to perform operations comprising:
    determining page resources that each include a plurality of persistent visual resources, each persistent visual resource being a visual resource that is displayed each time the page resource is displayed at a user device;
    for each of the determined page resources, generating one or more animation snippets from the plurality of persistent visual resources, comprising, for each of the one or more animation snippets:
        selecting a subset of the persistent visual resources;
        from each of the selected persistent visual resources, generating an image frame; and
        generating an animation snippet for the page resource, including:
            determining, for the page resource, a resource topic to which the subject matter of page the resource is descriptive, and
            categorizing the animation snippet as belonging to the resource topic,
            wherein the animation snippet includes each of the image frames generated from the selected persistent visual resources and that displays the image frames in a specific order;
    for a page resource for which one or more animation snippets have been generated, selecting one of the animation snippets for display as a search result that identifies the page resource as being responsive to a search query, wherein the selecting is based on a match between a topic for the search query and the resource topic that the one of the animation snippets was categorized as belonging to; and
    providing the selected animation snippet to a user device from which the search query was submitted.

* * * * *